United States Patent
Wawda et al.

(10) Patent No.: US 9,311,481 B1
(45) Date of Patent: Apr. 12, 2016

(54) SYSTEMS AND METHODS FOR CLASSIFYING PACKAGE FILES AS TROJANS

(71) Applicant: Symantec Corporation, Mountain View, CA (US)

(72) Inventors: Abubakar Wawda, Cupertino, CA (US); Matthew Yeo, Portland, OR (US); Jun Mao, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 39 days.

(21) Appl. No.: 14/486,424

(22) Filed: Sep. 15, 2014

(51) Int. Cl.
*G06F 21/56* (2013.01)
*H04L 29/06* (2006.01)

(52) U.S. Cl.
CPC ............ *G06F 21/562* (2013.01); *H04L 63/145* (2013.01)

(58) Field of Classification Search
CPC ..................................... G06F 21/562
USPC ........................................... 726/23
See application file for complete search history.

(56) References Cited

U.S. PATENT DOCUMENTS

2014/0283147 A1 * 9/2014 Tehranipoor et al. ... G06F 21/76 726/34

OTHER PUBLICATIONS

Crussell, Jonathan et al., "Attack of the Clones: Detecting Cloned Applications on Android Markets", http://web.cs.ucdavis.edu/~hchen/paper/esorics2012.pdf, as accessed on Jul. 30, 2014, ESORICs 2012, LNCS 7459, Springer-Verlag Berlin Heidelberg, (2012), pp. 37-54.
"Lookout", https://www.lookout.com/, as accessed Jul. 30, 2014, (Jan. 2, 1997).
"Kaspersky", http://usa.kaspersky.com/?domain=kaspersky.com, as accessed Jul. 30, 2014, (1997).

* cited by examiner

*Primary Examiner* — Jacob Lipman
(74) *Attorney, Agent, or Firm* — ALG Intellectual Property, LLC

(57) ABSTRACT

A computer-implemented method for classifying package files as Trojans may include (1) detecting a resemblance between an unclassified package file and a known legitimate package file, (2) determining that the unclassified package file is signed by a different signatory than a signatory that signed the known legitimate package file, (3) determining that a feature of the unclassified package file is suspicious, the feature being absent from the known legitimate package file, and (4) classifying the unclassified package file as a Trojan version of the known legitimate package file based on the unclassified package file being signed by the different signatory and having the suspicious feature. Various other methods, systems, and computer-readable media are also disclosed.

20 Claims, 6 Drawing Sheets

SYSTEMS AND METHODS FOR CLASSIFYING PACKAGE FILES AS TROJANS

BACKGROUND

Trojans, including malicious applications that hide inside or masquerade as legitimate programs, have long been a problem on desktop computing devices. Increasingly, users are shifting more and more computing activity from desktops to mobile devices such as smart phones and tablets. Users may download mobile applications to play games, organize their calendar, message other users, track transit schedules, or perform a wide and ever-growing variety of other functions. As legitimate mobile applications increase in number, so too does the danger increase of users accidentally downloading a Trojan version of a legitimate application.

Many traditional systems for classifying applications as Trojans involve manual analysis of the applications to determine whether a particular instance of an application is legitimate. Such manual analysis may be inefficient and time-intensive. For example, these traditional manual systems may not be able to keep up with the vast quantity of new mobile applications being introduced to mobile application stores on a daily basis. Some traditional systems may be able to detect similar applications, but may not be able to make value judgments about which of the applications is legitimate. Similarly, these traditional systems may not be able to map Trojan applications to their corresponding legitimate applications, except through manual and time-intensive study. Accordingly, the instant disclosure identifies and addresses a need for additional and improved systems and methods for classifying package files as Trojans.

SUMMARY

As will be described in greater detail below, the instant disclosure describes various systems and methods for classifying package files as Trojans by, for example, determining that an unclassified package file is similar to a legitimate package file but has a suspicious feature that is absent from the legitimate package file. In one example, a computer-implemented method for classifying package files as Trojans may include (1) detecting a resemblance between an unclassified package file and a known legitimate package file, (2) determining that the unclassified package file is signed by a different signatory than a signatory that signed the known legitimate package file, (3) determining that a feature of the unclassified package file is suspicious, and (4) classifying the unclassified package file as a Trojan version of the known legitimate package file based on the unclassified package file being signed by the different signatory and having the suspicious feature. The feature may also be absent from the known legitimate package file.

In some embodiments, the computer-implemented method may further include performing a security action based on classifying the unclassified package file as the Trojan version of the known legitimate package file. In some examples, the security action may include (1) alerting a developer of the known legitimate package file to the presence of the Trojan version of the known legitimate package file, (2) informing a user of the Trojan version of the known legitimate package file that the user is not using the known legitimate package file, (3) flagging the unclassified package file as the Trojan version of the known legitimate package file in an application store, and/or (4) removing the unclassified package file as the Trojan version of the known legitimate package file from an application store.

In some examples, detecting the resemblance between the unclassified package file and the known legitimate package file may include comparing the unclassified package file to known legitimate package files in a package file database. In some examples, detecting the resemblance between the unclassified package file and the known legitimate package file may include detecting the resemblance between code of the unclassified package file and code of the known legitimate package file. Additionally, or alternatively, detecting the resemblance between the unclassified package file and the known legitimate package file may include detecting the resemblance between metadata of the unclassified package file and metadata of the known legitimate package file. Similarly, detecting the resemblance between the unclassified package file and the known legitimate package file may include determining that the unclassified package file exceeds a predetermined threshold for similarity to the known legitimate package file.

In one embodiment, the unclassified package file may represent a mobile application. In further examples, determining that the feature of the unclassified package file is suspicious may include identifying an extra permission requested by the unclassified package file that is not requested by the known legitimate package file. In some examples, determining that the feature of the unclassified package file is suspicious may include identifying a negative reputation of the different signatory of the unclassified package file. In other examples, determining that the feature of the unclassified package file is suspicious may include identifying a different advertisement identifier that is not present in the known legitimate package file. Additionally or alternatively, determining that the feature of the unclassified package file is suspicious may include identifying an instance of the unclassified package file in an application store to which the known legitimate package file has not been published.

In one embodiment, a system for implementing the above-described method may include (1) a detection module, stored in memory, that detects a resemblance between an unclassified package file and a known legitimate package file, (2) a signatory determination module, stored in memory, that determines that the unclassified package file is signed by a different signatory than a signatory that signed the known legitimate package file, (3) a feature determination module, stored in memory, that determines that a feature of the unclassified package file is suspicious, (4) a classification module, stored in memory, that classifies the unclassified package file as a Trojan version of the known legitimate package file based on the unclassified package file being signed by the different signatory and having the suspicious feature, and (5) at least one physical processor configured to execute the detection module, the signatory determination module, the feature determination module, and the classification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect a resemblance between an unclassified package file and a known legitimate package file, (2) determine that the unclassified package file is signed by a different signatory than a signatory that signed the known legitimate package file, (3) determine that a feature of the unclassified package file is suspicious, and (4) classify the unclassified package file as a Trojan version of the known legitimate package file based on the unclassified package file being signed by the different signatory and having the suspicious feature.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
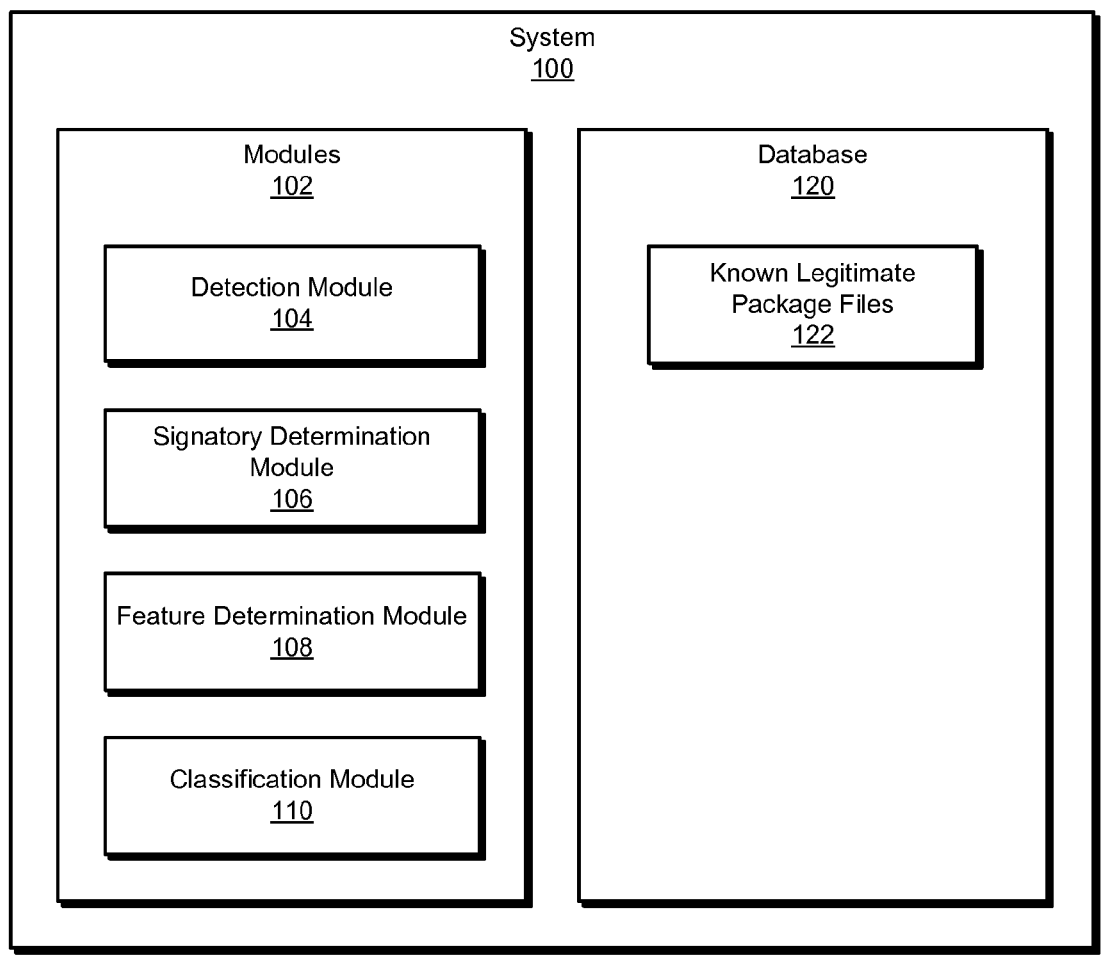
FIG. 1 is a block diagram of an exemplary system for classifying package files as Trojans.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for classifying package files as Trojans. As will be explained in greater detail below, by comparing a new, suspicious, and/or unclassified package file to other package files and checking for signature differences and suspicious changes the systems described herein may detect Trojan package files automatically and on a large scale.

Figure 2:
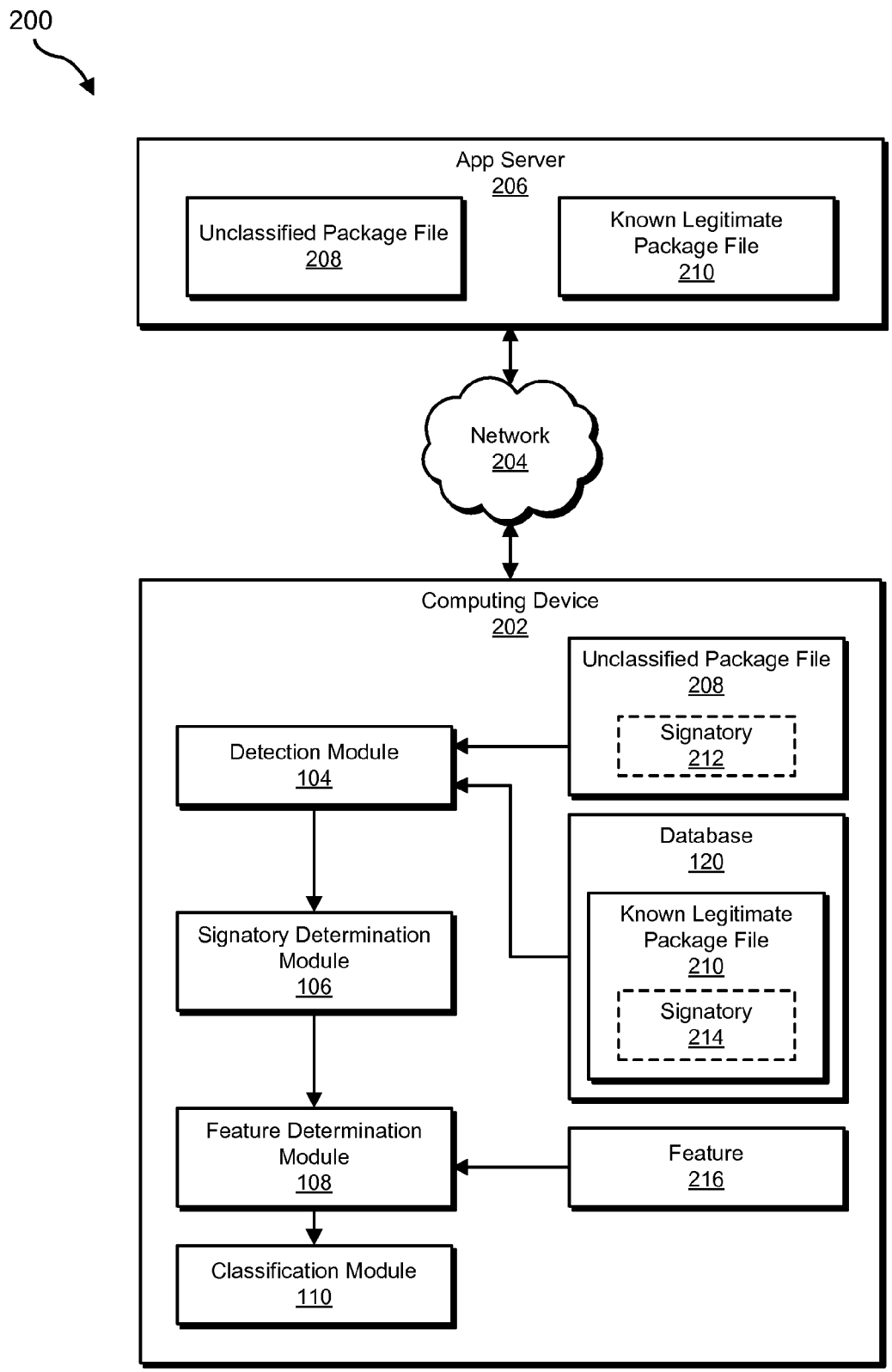
FIG. 2 is a block diagram of an additional exemplary system for classifying package files as Trojans.

The following will provide, with reference to FIGS. 1-2, detailed descriptions of exemplary systems for classifying package files as Trojans. Detailed descriptions of corresponding computer-implemented methods will also be provided in connection with FIG. 3. Detailed descriptions of an exemplary legitimate package file and an exemplary Trojan package file will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for classifying package files as Trojans. As illustrated in this figure, exemplary system 100 may include one or more modules 102 for performing one or more tasks. For example, and as will be explained in greater detail below, exemplary system 100 may include a detection module 104 that may detect a resemblance between an unclassified package file and a known legitimate package file. Exemplary system 100 may additionally include a signatory determination module 106 that may determine that the unclassified package file is signed by a different signatory than a signatory that signed the known legitimate package file. Exemplary system 100 may also include a feature determination module 108 that may determine that a feature of the unclassified package file is suspicious. The feature may be absent from the known legitimate package file. Exemplary system 100 may additionally include a classification module 110 that may classify the unclassified package file as a Trojan version of the known legitimate package file based on the unclassified package file being signed by the different signatory and having the suspicious feature. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or app server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store known legitimate package files 122, which may include the legitimate package files discussed below for FIG. 3.

Database 120 may represent portions of a single database or computing device or a plurality of databases or computing devices. For example, database 120 may represent a portion of app server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as app server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with an app server 206, such as an app store, via a network 204. In one example, computing device 202 may be programmed with one or more of modules 102 and/or may store all or a portion of the data in database 120. Additionally or alternatively, app server 206 may be programmed with one or more of modules 102 and/or may store all or a portion of the data in database 120.

In one embodiment, one or more of modules 102 from FIG. 1 may, when executed by at least one processor of computing device 202 and/or app server 206, enable computing device 202 and/or app server 206 to classify package files as Trojans. For example, and as will be described in greater detail below, detection module 104 may detect a resemblance between an unclassified package file 208 and a known legitimate package file 210. Signatory determination module 106 may determine that unclassified package file 208 is signed by a different signatory 212 than a signatory 214 that signed known legitimate package file 210. Next, feature determination module 108 may determine that a feature 216 of unclassified package file 208 is suspicious. Feature 216 may be absent from known legitimate package file 210. Finally, classification module 110 may classify unclassified package file 208 as a Trojan version of known legitimate package file 210 based on unclassified package file 208 being signed by different signatory 212 and having suspicious feature 216.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

App server 206 generally represents any type or form of computing device that is capable of hosting package files that represent applications. Examples of app server 206 include, without limitation, mobile device application stores, application servers, and web hosting servers.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and app server 206.

The term "Trojan," as used herein, generally refers to any malicious file and/or collection of files that represents itself as a legitimate file. In some examples, a Trojan may use the name and/or icon of a legitimate application and/or may perform some of the same functions as a legitimate application in addition to performing malicious functions. For example, a Trojan may be a copy of a popular mobile game application that also infects the user's mobile device with additional malware.

Figure 3:
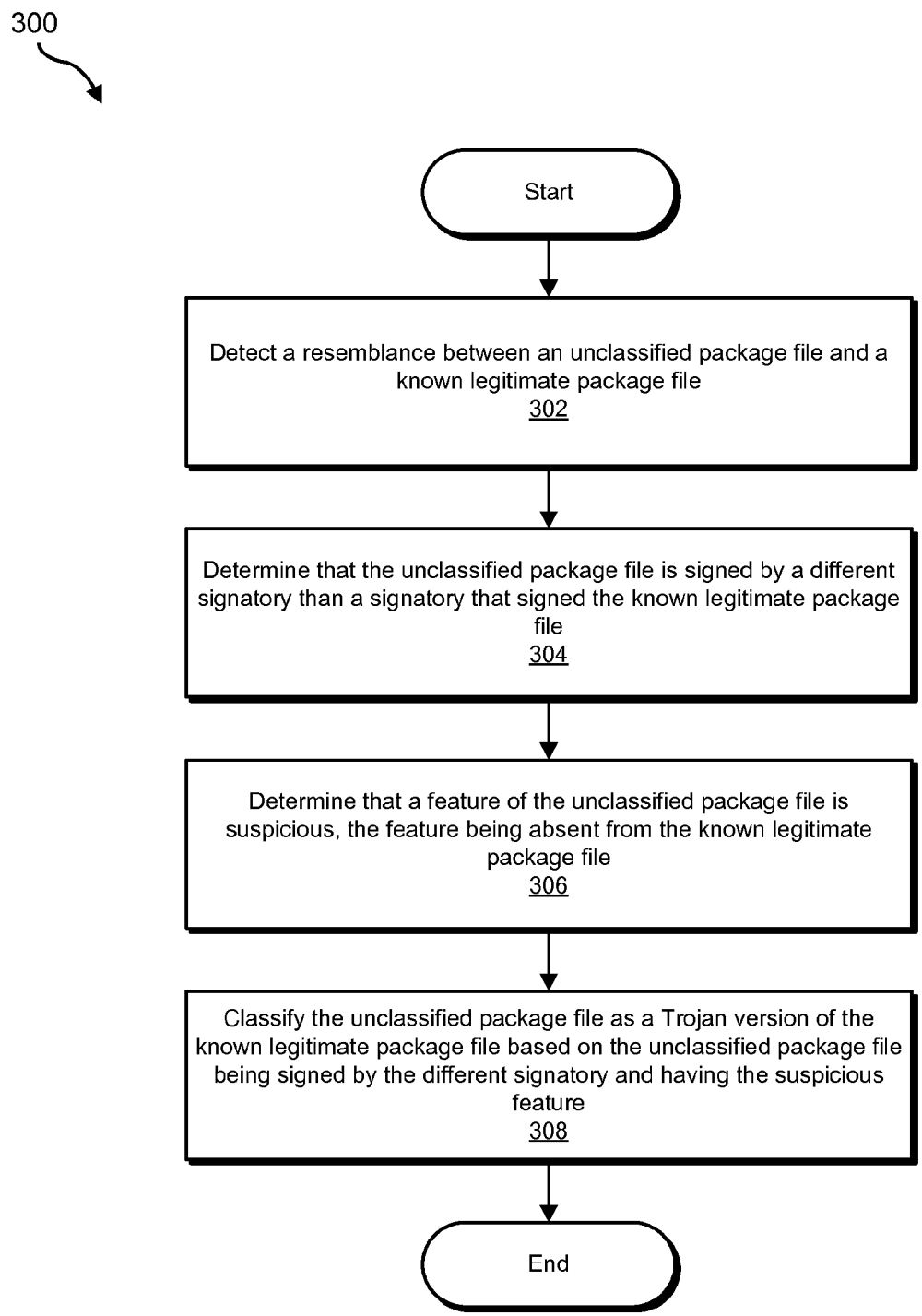
FIG. 3 is a flow diagram of an exemplary method for classifying package files as Trojans.

FIG. 3 is a flow diagram of an exemplary computer-implemented method 300 for classifying package files as Trojans. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may detect a resemblance between an unclassified package file and a known legitimate package file. For example, detection module 104 may, as part of computing device 202 in FIG. 2, detect a resemblance between unclassified package file 208 and known legitimate package file 210.

The term "package file," as used herein, generally refers to any file and/or set of files and/or metadata. In some examples, a package file may include a collection of files and/or metadata organized in a specified format. For example, a package file may include a manifest file that lists the other files in the package file. In some examples, a package file may include an ANDROID application package file (APK) used to install applications into mobile devices.

The term "unclassified package file," as used herein, generally refers to any package file that has not been explicitly verified as legitimate. In some examples, an unclassified package file may be a new file recently uploaded to an app server. In other examples, an unclassified package file may be tagged by a user and/or automated system as being suspicious. Additionally or alternatively, an unclassified package file may be any package file that is not currently present in a database of package files that a security system has already classified as either legitimate or malicious. In one embodiment, an unclassified package file may represent a mobile application. For example, an unclassified package file may be an APK file used for installing applications onto ANDROID mobile devices.

Detection module 104 may detect the resemblance between the package files in a variety of ways and/or contexts. For example, detection module 104 may be part of a computing system configured to analyze package files in order to detect Trojans and/or other malware in package files originating from a variety of other systems. In other examples, detection module 104 may be part of a security system in an app server designed to detect Trojans within the app server. Additionally or alternatively, detection module 104 may be present on a mobile device and may send a hash and/or signature of a recently installed application to a remote database of application signatures for comparison.

In some examples, detection module 104 may detect the resemblance between the unclassified package file and the known legitimate package file by comparing the unclassified package file to multiple known legitimate package files in a package file database. For example, detection module 104 may, as part of computing device 202 in FIG. 2, compare unclassified package file 208 to any or all of the package files stored within database 120. In one example, detection module 104 may compare unclassified APKs to other APKs stored in a security database before storing the now-classified APKs in the database as well.

In some embodiments, detection module 104 may prioritize popular package files for comparison with unclassified package files. The creators of Trojan applications typically create their Trojan applications with the goal of causing as many users as possible to download the Trojan, and thus popular applications are at a higher risk of being copied. Therefore, any given Trojan file encountered is likely to be a copy of a popular application. In some examples, detection module 104 may determine the popularity of APKs in a download store by download counts, installation rates on client devices, reviews, ratings, and/or any or all of a variety of other metrics (e.g., basing priority on degree of popularity or using a threshold value for any of these metrics). In these examples, detection module 104 may compare unclassified APKs with potentially similar popular APKs before and/or in lieu of comparing the unclassified APKs to APKs not categorized as popular.

In some examples, detection module 104 may detect the resemblance between the unclassified package file and the known legitimate package file by detecting the resemblance between code of the unclassified package file and code of the known legitimate package file. Additionally or alternatively, detection module 104 may detect the resemblance between the unclassified package file and the known legitimate package file by detecting the resemblance between metadata of the unclassified package file and metadata of the known legitimate package file. In some examples, detection module 104 may detect the resemblance between the unclassified package file and the known legitimate package file by determining that the unclassified package file exceeds a predetermined threshold for similarity to the known legitimate package file. For example, detection module 104 may determine that the unclassified package file is similar to the known legitimate package file if the code and/or metadata of the two package files is 90% similar according to a matching algorithm.

At step 304, one or more of the systems described herein may determine that the unclassified package file is signed by a different signatory than a signatory that signed the known legitimate package file. For example, signatory determination module 106 may, as part of computing device 202 in FIG. 2, determine that unclassified package file 208 is signed by different signatory 212 than signatory 214 that signed known legitimate package file 210.

The term "signatory," as used herein, generally refers to any developer, group of developers, enterprise, and/or other entity that has marked a package file as authentic and/or authored or endorsed by the signatory. In some examples, a signatory may be the holder of a private key used to create a digital signature with which to sign a package file. For example, the developer of an APK file may digitally sign the APK file before uploading it to an app server. In this example, a malicious developer may digitally sign a Trojan version of the APK file with a new digital signature because the malicious developer does not have access to the original developer's digital signature.

Signatory determination module 106 may determine that the unclassified package file is signed by a different signatory than the known legitimate package file in a variety of ways and/or contexts. For example, signatory determination module 106 may compare the digital signature of an unclassified file to the digital signature of a similar known legitimate package file and determine that the signatures were created by different signatories. In some examples, signatory determination module 106 may be part of a computing system configured to detect Trojan versions of applications. In other examples, signatory determination module 106 may be part of a security system for an app server that may be configured to detect potential Trojan applications published to the app server.

At step 306, one or more of the systems described herein may determine that a feature of the unclassified package file is suspicious. The feature may be absent from the known legitimate package file. For example, feature determination module 108 may, as part of computing device 202 in FIG. 2, determine that feature 216 of unclassified package file 208 is suspicious. In further examples, feature determination module 108 may determine that feature 216 is absent and classification module 110 may base the classification of unclassified package file 208 in part on that determination.

The term "feature," as used herein, generally refers to any aspect, classification, and/or description of a package file. Examples of a feature may include, without limitation, code, metadata, a function call, an application programming interface (API) call, a link to third-party content, an identifier (ID), a location to which a package file is published, a reputation, a publisher, a reputation of a publisher, a rating, a review, a size, and/or a behavior of a package file.

Feature determination module 108 may determine that a feature of an unclassified package file is suspicious in a variety of ways and/or contexts. For example, feature determination module 108 may use a heuristic to determine if a package file fits the criteria for a malicious file. In another example, feature determination module 108 may compare features of a package file against a list of known suspicious features.

Figure 4:
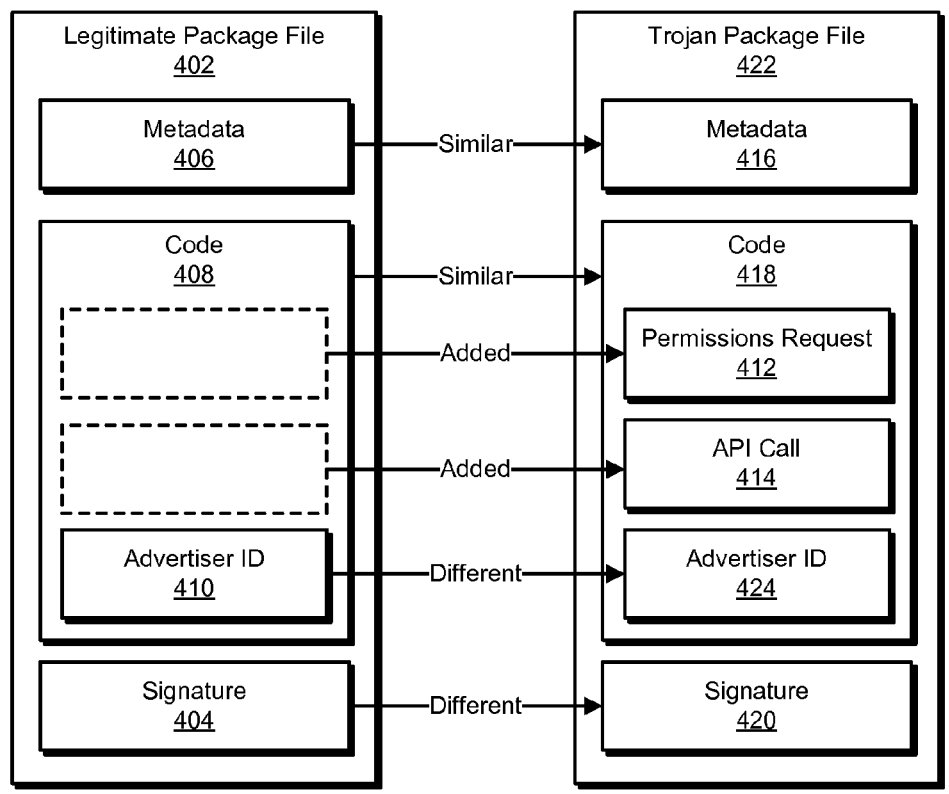
FIG. 4 is a block diagram of an exemplary legitimate package file and an exemplary Trojan package file.

A Trojan version of a legitimate package file may differ from the original in a number of ways, as illustrated in FIG. 4. A legitimate package file 402 may include metadata 406, code 408, and/or a signature 404. An advertiser ID 410 may be hard coded into code 408 and/or may be present elsewhere in the package file. In this example, a Trojan package file 422 may be a Trojan version of legitimate package file 402. Trojan package file 422 may include metadata 416 and/or code 418 that may be similar to metadata 406 and/or code 408, respectively. Feature determination module 108 may detect a variety of suspicious features in Trojan package file 422.

In some examples, feature determination module 108 may determine that the feature of the unclassified package file is suspicious by identifying an extra permission requested by the unclassified package file that is not requested by the known legitimate package file. For example, as illustrated in FIG. 4, Trojan package file 422 may include a permissions request 412 that is not present in legitimate package file 402. Examples of permissions request 412 may include, without limitation, requests to access a mobile device's list of contacts, requests for administrative privileges, requests to send outbound messages, and/or requests to access any other sensitive data.

In some examples, feature determination module 108 may determine that the feature of the unclassified package file is suspicious by identifying a different advertisement identifier that is not present in the known legitimate package file. For example, Trojan package file 422 may include an advertiser ID 424 that is different from advertiser ID 410 in legitimate package file 402. In some examples, advertiser ID 424 may belong to an advertisement provider that hosts malicious content that may infect and/or track a user that views advertisements. In other examples, advertiser ID 424 may belong to an advertisement provider that is not inherently malicious but that affiliates with the creators of the Trojan package file.

Additionally or alternatively, feature determination module 108 may determine that the feature of the unclassified package file is suspicious by detecting malicious code in the unclassified package file. Malicious code may include any code that takes actions contrary to a user's wishes such as sending messages, accessing sensitive information, deleting files, downloading malicious files, and/or displaying extra advertisements. In some examples, as illustrated in FIG. 4, Trojan package file 422 may include an API call 414 that may be a malicious API call.

In some examples, feature determination module 108 may determine that the feature of the unclassified package file is suspicious by identifying a negative reputation of the different signatory of the unclassified package file. For example, Trojan package file 422 may include a different signature 420 than signature 404 of legitimate package file 402. In some examples, signature 420 may have been created by the malicious developer of Trojan package file 422 that may have also signed other malicious files. In these examples, the malicious developer may have a negative reputation as a signatory.

In some examples, feature determination module 108 may determine that the feature of the unclassified package file is suspicious by identifying an instance of the unclassified package file in an application store to which the known legitimate package file has not been published. For example, the known legitimate package file may be available in GOOGLE PLAY and/or the AMAZON APPSTORE but may not have been published to APPSLIB. In this example, the unclassified package file may be available in APPSLIB, which may constitute a suspicious feature of the unclassified package file.

In some examples, feature determination module 108 may analyze features of an unclassified package file in response to signatory determination module 106 determining that the unclassified package file is signed by a different signatory than the signatory of a similar package file. In other examples, signatory determination module 106 may compare signatories in response to feature determination module 108 detecting a suspicious feature of a package file. In further examples, all or part of these determinations may be performed in parallel.

Returning to FIG. 3, at step 308, one or more of the systems described herein may classify the unclassified package file as a Trojan version of the known legitimate package file based on the unclassified package file being signed by the different signatory and having the suspicious feature. For example, classification module 110 may, as part of computing device 202 in FIG. 2, classify unclassified package file 208 as a Trojan version of known legitimate package file 210 based on unclassified package file 208 being signed by different signatory 212 and having suspicious feature 216.

Classification module 110 may classify the unclassified package file as a Trojan in a variety of ways and/or contexts. For example, classification module 110 may be part of a computing system configured to detect Trojans on any number of other systems. In another example, classification module 110 may be part of the security system for an app server.

In one example, classification module 110 may classify a package file as a Trojan based on the package file exceeding a predetermined threshold for suspiciousness. For example, classification module 110 may only classify a package file as suspicious if the package file has a different signature than a similar package file and has at least two suspicious features. In another example, a variety of suspicious features may have weights indicating the likelihood that the feature is malicious. For example, the feature of being published in an app server that a similar legitimate application is not published in may have a low weight, while the feature of making an API call that would display additional advertisements on a mobile device may have a high weight.

In some embodiments, the systems described herein may perform a security action based on classifying the unclassified package file as the Trojan version of the known legitimate package file. In some examples, the security action may include (1) alerting a developer of the known legitimate package file to the presence of the Trojan version of the known legitimate package file, (2) informing a user of the Trojan version of the known legitimate package file that the user is not using the known legitimate package file, (3) flagging the unclassified package file as the Trojan version of the known legitimate package file in an application store, and/or (4) removing the unclassified package file from an application store.

As explained in connection with method 300 above, the systems and methods described herein may compare APKs to known legitimate APKs in a database in order to detect Trojans. In some examples, popular APKs may be given priority for comparison to unclassified APKs. If an unclassified APK is found to be signed by a different signatory than a popular APK that it resembles, the systems described herein may analyze the unclassified APK for suspicious features. The systems described herein may classify any APK that resembles a popular APK but has a different signatory and at least one suspicious feature as a Trojan version of the popular APK. By determining that the unclassified APK is not just malicious but is also a Trojan version of a specific legitimate APK, the systems described herein can take more directed security actions such as alerting the developers of the legitimate APK and/or informing users of the Trojan APK that a legitimate version exists. By automatically making such determinations the systems described herein may efficiently identify a large number of Trojans.

Figure 5:
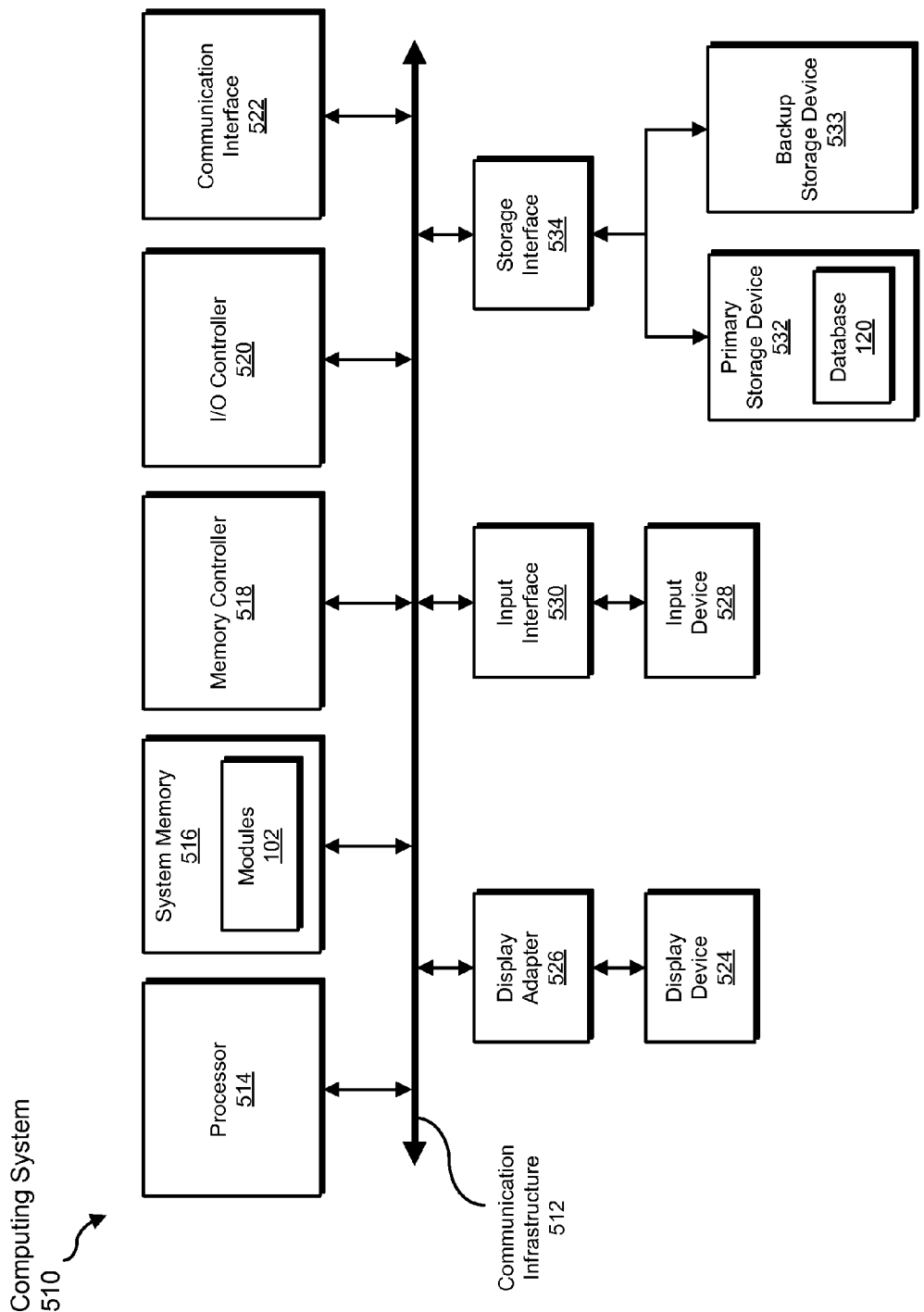
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
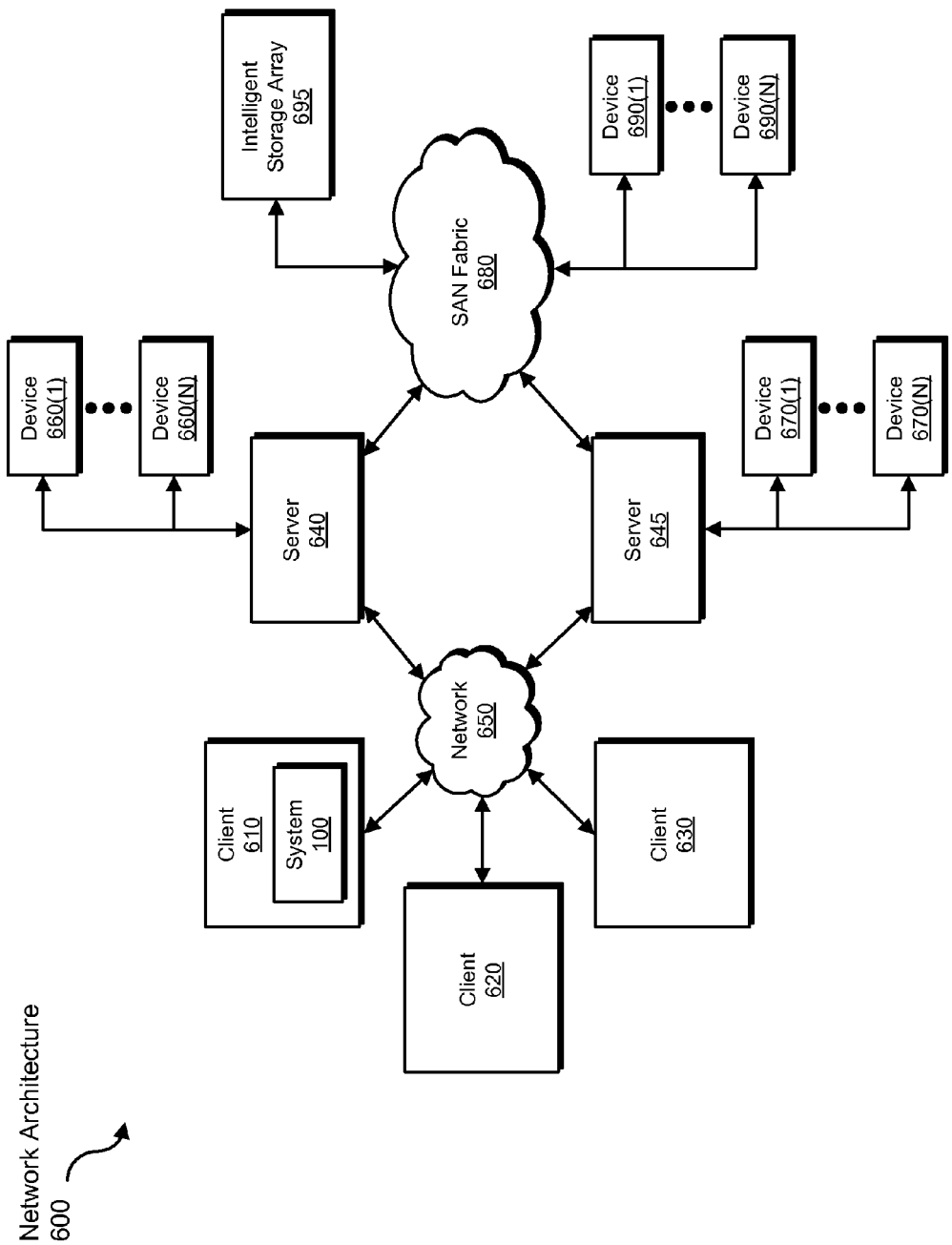
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for classifying package files as Trojans.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive package file data to be transformed, transform the package file data, output a result of the transformation to a database, use the result of the transformation to determine whether a package file is similar to another package file and/or malicious, and store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for classifying package files as Trojans, at least a portion of the method being performed by a computing device comprising at least one processor, the method comprising:
   detecting a resemblance between an unclassified package file and a known legitimate package file;
   determining that the unclassified package file is signed by a different signatory than a signatory that signed the known legitimate package file;
   determining that a feature of the unclassified package file is suspicious, the feature being absent from the known legitimate package file;
   classifying the unclassified package file as a Trojan version of the known legitimate package file based on the unclassified package file being signed by the different signatory and having the suspicious feature.

2. The computer-implemented method of claim 1, wherein detecting the resemblance between the unclassified package file and the known legitimate package file comprises comparing the unclassified package file to a plurality of known legitimate package files in a package file database.

3. The computer-implemented method of claim 1, wherein detecting the resemblance between the unclassified package file and the known legitimate package file comprises determining that the unclassified package file exceeds a predetermined threshold for similarity to the known legitimate package file.

4. The computer-implemented method of claim 1, wherein the unclassified package file represents a mobile application.

5. The computer-implemented method of claim 1, wherein determining that the feature of the unclassified package file is suspicious comprises identifying an extra permission requested by the unclassified package file that is not requested by the known legitimate package file.

6. The computer-implemented method of claim 1, wherein determining that the feature of the unclassified package file is suspicious comprises identifying a negative reputation of the different signatory of the unclassified package file.

7. The computer-implemented method of claim 1, wherein determining that the feature of the unclassified package file is suspicious comprises identifying a different advertisement identifier that is not present in the known legitimate package file.

8. The computer-implemented method of claim 1, wherein determining that the feature of the unclassified package file is suspicious comprises identifying an instance of the unclassified package file in an application store to which the known legitimate package file has not been published.

9. The computer-implemented method of claim 1, wherein detecting the resemblance between the unclassified package file and the known legitimate package file comprises at least one of:
  detecting the resemblance between code of the unclassified package file and code of the known legitimate package file;
  detecting the resemblance between metadata of the unclassified package file and metadata of the known legitimate package file.

10. The computer-implemented method of claim 1, further comprising performing a security action based on classifying the unclassified package file as the Trojan version of the known legitimate package file.

11. The computer-implemented method of claim 10, wherein the security action comprises at least one of:
  alerting a developer of the known legitimate package file to the presence of the Trojan version of the known legitimate package file;
  informing a user of the Trojan version of the known legitimate package file that the user is not using the known legitimate package file;
  flagging the unclassified package file as the Trojan version of the known legitimate package file in an application store;
  removing the unclassified package file from an application store.

12. A system for classifying package files as Trojans, the system comprising:
  a detection module, stored in memory, that detects a resemblance between an unclassified package file and a known legitimate package file;
  a signatory determination module, stored in memory, that determines that the unclassified package file is signed by a different signatory than a signatory that signed the known legitimate package file;
  a feature determination module, stored in memory, that determines that a feature of the unclassified package file is suspicious, the feature being absent from the known legitimate package file;
  a classification module, stored in memory, that classifies the unclassified package file as a Trojan version of the known legitimate package file based on the unclassified package file being signed by the different signatory and having the suspicious feature;
  at least one physical processor configured to execute the detection module, the signatory determination module, the feature determination module, and the classification module.

13. The system of claim 12, wherein the detection module detects the resemblance between the unclassified package file and the known legitimate package file by comparing the unclassified package file to a plurality of known legitimate package files in a package file database.

14. The system of claim 12, wherein the detection module detects the resemblance between the unclassified package file and the known legitimate package file by determining that the unclassified package file exceeds a predetermined threshold for similarity to the known legitimate package file.

15. The system of claim 12, wherein the unclassified package file represents a mobile application.

16. The system of claim 12, wherein the feature determination module determines that the feature of the unclassified package file is suspicious by identifying an extra permission requested by the unclassified package file that is not requested by the known legitimate package file.

17. The system of claim 12, wherein the feature determination module determines that the feature of the unclassified package file is suspicious by identifying a negative reputation of the different signatory of the unclassified package file.

18. The system of claim 12, wherein the classification module further performs a security action based on classifying the unclassified package file as the Trojan version of the known legitimate package file.

19. The system of claim 18, wherein the security action comprises at least one of:
  alerting a developer of the known legitimate package file to the presence of the Trojan version of the known legitimate package file;
  informing a user of the Trojan version of the known legitimate package file that the user is not using the known legitimate package file;
  flagging the unclassified package file as the Trojan version of the known legitimate package file in an application store;
  removing the unclassified package file from an application store.

20. A non-transitory computer-readable medium comprising one or more computer-readable instructions that, when executed by at least one processor of a computing device, cause the computing device to:
  detect a resemblance between an unclassified package file and a known legitimate package file;
  determine that the unclassified package file is signed by a different signatory than a signatory that signed the known legitimate package file;
  determine that a feature of the unclassified package file is suspicious, the feature being absent from the known legitimate package file;
  classify the unclassified package file as a Trojan version of the known legitimate package file based on the unclassified package file being signed by the different signatory and having the suspicious feature.

* * * * *